Figure 1:
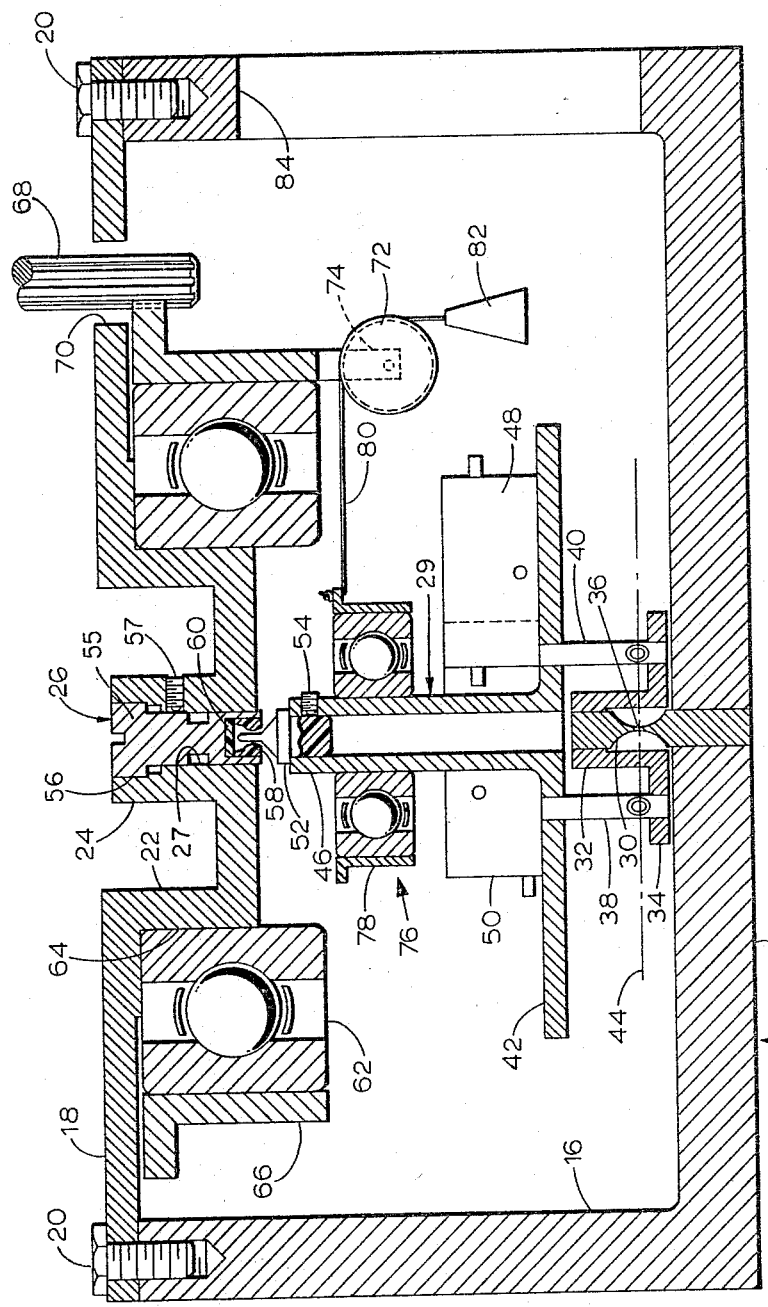

RICHARD C. REMINGTON
INVENTOR.

BY S. A. Gianatana
Francis L. Masselle
ATTORNEYS

Oct. 18, 1966  R. C. REMINGTON  3,279,083
PRECISION MEASURING DEVICE
Filed Sept. 23, 1963  2 Sheets-Sheet 2

RICHARD C. REMINGTON
INVENTOR.

BY S. A. Giarratana
Francis L. Masselle
ATTORNEYS

United States Patent Office 3,279,083
Patented Oct. 18, 1966

3,279,083
PRECISION MEASURING DEVICE
Richard C. Remington, Pompton Plains, N.J., assignor to General Precision Inc., Little Falls, N.J., a corporation of Delaware
Filed Sept. 23, 1963, Ser. No. 310,732
13 Claims. (Cl. 33—174)

The present invention relates to precision measuring devices for measuring small bores, and more particularly to a precision measuring device for measuring the fit between a pivot and jewel bearing of the type used in a gyroscope.

In accordance with the present invention, the fit of a jewel and pivot set is measured to an accuracy of ± micro inches by a device comprising an erect pivot support member, spring hinge mounted at its lower end with the pivot to be measured mounted on the upper free end of the support member. Two high accuracy vertical sensing elements are also attached to the support member with their sensitive axes positioned 90° to each other so as to accurately sense the verticality of the pendulum. The jewel to be measured is mated to the pivot but separately supported by a rigid supporting fixture. The inner race of a ball bearing is press fit on the support member and means is provided for exerting a radial force on the outer race of the ball bearing. The outer race and force applying means are rotated at a slow, steady velocity through 360° to continuously change the direction of the radial force on the support member. With this arrangement the support member is deflected until the pivot contacts the jewel and, as the direction of the force changes, the pivot traces the bore of the jewel with a constant predetermined pressure and without rotation of the jewel or pivot. The output signals of the vertical sensing elements are amplified and applied to a two-channel recorder which measures the movement of the pivot relative to the jewel.

Accordingly, it is one object of the invention to provide a precision measuring device for measuring small bores.

It is another object of the invention to provide a precision measuring device for measuring the fit between a male and female member.

It is a further object of the invention to provide a precision measuring device for measuring the fit of a jewel and pivot bearing of the type used in gyros.

It is a still further object of the invention to provide a precision measuring device for measuring the fit between a jewel and pivot bearing of the type described wherein the jewel is held stationary and forces are applied to the pivot to cause it to trace the bore of the jewel without rotating.

It is a still further object of the invention to provide a precision measuring device of the type described above employing vertical sensing elements for measuring the verticality of the pivot as it traces the bore of the jewel.

Figure 2:
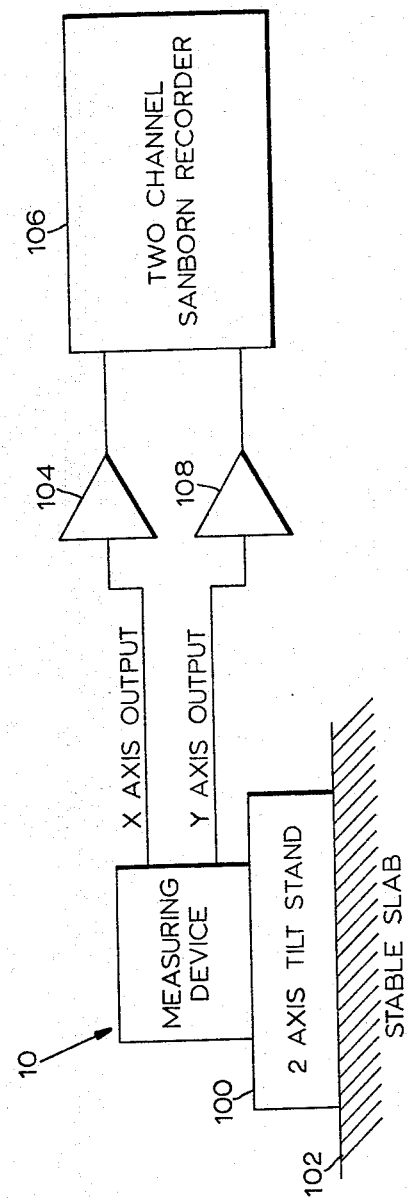

Other objects and features of novelty of the present invention will be specifically pointed out or will otherwise become apparent when referring, for a better understanding of the invention, to the following description taken in conjunction with the accompanying drawings, wherein;

FIG. 1 is a vertical sectional view illustrating one embodiment of the invention; and FIG. 2 is a schematic block diagram of the invention.

Referring to FIG. 1, a precision measuring device 10 embodying features of the invention is illustrated. It comprises a housing 12 having a bottom wall 14, a cylindrical side wall 16 and a removable cover plate 18 suitably attached to the upper end of the side wall, such as by a plurality of bolts 20. The cover plate has a cup-shaped recess 22 in the center thereof with a bushing 24 in the center of the cup-shaped recess. The jewel assembly 26 of the pivot-and-jewel set to be measured is supported in the bore 27 of the bushing, as will be described.

The pivot of the jewel-and-pivot set is installed on an elongated support member 29 mounted for a limited degree of universal angular displacement as will now be described. A spring hinge 30 is mounted on the bottom wall 14 of the housing and a bushing 32 having a radially outward projecting flange 34 on the lower end thereof is supported on the upper end of the spring hinge 30. A small clearance is provided between the flange 34 and the bottom wall 14 to permit limited pivotal movement of the bushing 32 and flange 34 about an axis passing through the center line 36 of the spring hinge perpendicular to the plane of the figure. This axis will hereinafter be referred to as the X axis.

A pair of spring hinges 38 and 40 are fixed to and project upwardly from the flange 34 in position to support a nominally horizontal plate portion 42 of member 29 in parallel spaced relation above the flange 34. The spring hinges 38 and 40 enable the plate portion 42, and, therefore, member 29, to pivot relative to the bushing 32 about a Y axis 44 which perpendicularly intersects the aforementioned X axis. The plate portion 42 is spaced a small distance above the upper end of the bushing 32 to allow for limited pivotal movement. A sleeve portion 46 of member 29 projects upwardly from the plate portion 42 with the axis thereof perpendicular to the plane defined by the X and Y axes and passing through the intersection of the X and Y axes when the sleeve portion 46 is vertical, as will be described. Thus, the plate portion 42 and sleeve portion 46 comprises a pivot-support member mounted for limited universal movement relative to the housing 12 with the upper end of the sleeve being remote from the center of angular displacement (defined by the intersection of axes X and Y) and being adapted to receive the pivot 52 of the jewel-and-pivot set.

A very sensitive bubble type vertical sensing element 48 is mounted on the plate 42 with its sensing axis parallel to the Y axis 44 and a similar vertical sensing element 50 is supported on the plate 42 on the other side of the sleeve 46 with its sensing axis parallel to the X axis defined by the spring hinge 30. The pivot 52 of the jewel-and-pivot set to be measured is fixed in the upper end of the sleeve 46, such as by a set screw 54. The jewel assembly 26 comprises a jewel holder 55 having a threaded portion 56 on the upper end thereof so that it can be screwed into the bushing 24 and fixed against rotation by a set screw 57. An annular hole jewel 58 is fixed within the end of holder 55 in position to fit over or mate with the end of the pivot 52. An "end stone" 60 is also fixed within the end of the support to limit the penetration of the end of the pivot. With this construction, any clearance between the end of the pivot 52 and hole jewel 58 will allow the upper free end of sleeve 46 to move and this movement will be detected by the vertical sensing elements 48 and 50.

The inner race of a ball bearing 62 is fixed on the outer wall 64 of the cup-shaped recess 22 in the cover plate 18. A ring gear 66 is fixed on the outer race of the ball bearing 62 in position to mesh with a pinion gear 68 projecting through an aperture 70 in the cover plate 18. The pinion gear 68 is driven by a suitable motor (not shown) to rotate the ring gear 66 slowly, such as about 2 r.p.m. A pulley 72 is rotatably mounted on a rigid support 74 projecting downwardly from the ring gear 66. The pulley rotates with the ring gear 66 and at the same time is free to rotate relative thereto.

The inner race of a ball bearing 76 is press fitted on the upper end of the sleeve 46 and a flanged ring 78 is press fitted on the outer race of the ball bearing. A line 80 made of a suitable material such as nylon, or the like, is connected to the flange of the ring 78 and extends over the pulley 72 in position to support a weight 82 on the other end thereof. With this arrangement, the weight 82 exerts a radially outwardly directed force on the ring 78, and as the pulley rotates with the ring gear 66, the direction of the applied radial force revolves through 360° each revolution of the ring gear 66. With this construction, it is apparent that the end of the pivot 52 always contacts the bore of the hole jewel 58 with a constant predetermined pressure determined by the weight 82, and the point of contact will change as the direction of the applied radial force changes so that the pivot will trace the bore of the hole jewel without rotation of either the pivot or the hole jewel. A suitable access opening 84 is provided in the wall 16 of the housing to facilitate placing the line 80 over the pulley 72 and hanging the weight 82 in place.

Since the precision measuring device 10 enables the pivot 52 to trace the bore of the hole jewel 58 without rotation of either part, the peak to peak travel of the pivot 52 in any plane through its axis is a measure of the clearance between the parts. If the diameter of the end of the pivot is known, then the bore diameter of the hole jewel 58 in that plane is the diameter of the end of the pivot plus the clearance between the two parts plus or minus the roundness error in the end of the pivot. It is also apparent that an indication of roundness can be obtained by analyzing the clearance between the parts in a number of planes through the axis of the pivot.

Referring to FIG. 2, a schematic block diagram is shown in which the precision measuring device 10 is mounted on a conventional two-axis tilt stand 100 which in turn is mounted on a stable slab 102. The two axes of the tilt stand are aligned with the X and Y axes of the device 10. The X axis output from the vertical sensing element 48 is amplified by an amplifier 104 and applied to one channel of a suitable recorder 106, such as a two-channel Sanborn recorder or a servo-driven X-Y plotter. The Y axis output of the vertical sensing element 50 is amplified by an amplifier 108 and applied to the other channel of the recorder 106. In the embodiment illustrated wherein the amplifiers 104 and 108 have a gain of 20 to 1 and the distance from the free end of sleeve 46 to the intersection of axes X and Y is one inch, a 1-arc second deflection gives an output on a Sanborn recorder of 5 millivolts. This is equivalent to 4.725 micro inches of travel at a point one inch from the pivot point of support member 29. Applying these parameters to the measuring device 10 and reducing the gain of the amplifiers 104 and 108 slightly, a scale factor of 1 millivolt (1 mm. on the Sanborn recorder) per micro inch of travel of the pivot 52 may be realized. It has been found that the measuring device 10 is capable of measuring pivot and jewel diameters to an accuracy of plus or minus 5 micro inches or better. Short-term repeatability of the measuring device 10 in an air-conditioned area has been found to be within a 0.2 arc second spread and it is believed that this error is caused by the tilt table setting or human error. Due to its exceptional sensitivity, the device 10 should be used in conjunction with the stable slab 102, and the two-axis tilt stand 100 should be capable of very accurate adjustment.

The fit of a jewel-and-pivot set can be checked to the same accuracy in approximately two minutes time by the following procedure. With the cover plate 18 removed, a pivot 52 of known dimensions is mounted and locked in the upper end of the sleeve 46. The cover plate is then replaced and secured. The jewel bearing assembly 26 to be measured is screwed in place to a depth that cannot cause contact of the pivot end with the end stone 60. Through the side access opening 84, the line 80 is placed over the pulley and the weight 82 hung in place. The two-axis tilt stand 100 is adjusted until both the X and Y axis outputs are near their null positions. If the recorder 106 is a dual channel Sanborn recorder, it is set on its 2x scale. The motor for driving the pinion 68 is started and the recorder pen travel is noted. The jewel holder 55 of the jewel assembly 26 is then slowly and carefully turned in until the recorder pens stop. This indicates that the end stone 60 has engaged the end of the pivot 52. The jewel holder 55 is then backed out a predetermined number of turns to achieve the desired end play and locked. The drive motor is then stopped with the line 80 extending along the Y axis so that the weight 82 is deflecting the sleeve 46 about the X axis. The tilt stand 100 is then adjusted until the Y axis output is at zero and the X axis output is near full scale (1x on the Sanborn scale). The drive motor is then started again to drive the pinion 68 and both the X and Y axis outputs are recorded simultaneously through one revolution of the ring gear 66.

If a two-channel Sanborn recorder is used, as mentioned above, the diameter of the bore of the hole jewel 58 will be two times the algebraic sum of the recorder readings plus the diameter of the end of the pivot for any position along the recorded curve, provided that the curves are properly oriented about zero, or a zero correction factor has been applied. If a servo driven X-Y plotter is employed as the recorder, the diameter of the bore of the hole jewel 58 will be the diameter of the end of the pivot plus the diameter of the circular plot recorded by the X-Y plotter. In either case, the recordings will indicate the fit on the jewel and pivot directly.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A precision measuring device for measuring small bores, comprising: an elongate support member; means mounting said support member adjacent one end thereof for swinging movement about X and Y axes orthogonally related to the longitudinal axis thereof, the free end of said support member being adapted to support a cylindrical part of known diameter; supporting means adapted to support a part having a bore therein in mated relationship with said one part; means for applying a radial force to said support member to cause said first part to contact the wall of the bore in said second part; means for continuously revolving said radially applied force through 360° to cause said first part to trace the bore of said second part; and means for sensing the verticality of said support member whereby any change in verticality thereof will be directly related to the clearance between said parts.

2. The invention as defined in claim 1 wherein said sensing means comprises a fisrt vertical sensing element mounted for movement with said support member and having its sensing axis aligned wtih said X axis, and a second vertical sensing element mounted for movement with said support member and having its sensing axis aligned with said Y axis.

3. A precision measuring device comprising a support, a supporting element, spring hinge means for mounting said supporting element on said support for pivotal movement relative thereto about an X axis, a support member having a longitudinal axis, spring hinge means for mounting said support member on said supporting element for pivotal movement about a Y axis orthogonally related to the longitudinal axis of the support member and said X axis, means for supporting a cylindrical part on the free end of said support member coaxially aligned with the axis of said member, supporting means for supporting a second part with a cylindrical opening therein in mated relationship with said cylindrical part, vertical sensing element means on said support member for sensing the vertical position thereof, means for applying a radial force to said support member to move said cylindrical part into contact with the wall of the cylindrical opening in siad second part, and means for revolving the radial force applying means through 360° to cause said cylindrical part to trace the cylindrical opening in said second part without rotation of either part.

4. The invention as defined in claim 3 wherein said vertical sensing element means comprises a first vertical sensing element mounted on said support member with the sensing axis thereof aligned with said X axis and a second vertical sensing element mounted on said support member with the sensing axis thereof aligned with said Y axis.

5. The invention as defined in claim 3 wherein said radial force applying means comprises an attachment member rotatably mounted on said support member for rotation about the axis of said support member, a line having one end thereof attached to said attachment member, and means for applying a radially outward directed force to the other end of said line, and wherein said revolving means comprises means for orbiting said last mentioned means about the axis of said support member.

6. A precision measuring device comprising a housing having a bottom wall and a removable coverplate forming a top wall therefor, a support member within said housing having a plate portion and a sleeve portion, spring hinge means for mounting said plate portion on said bottom wall in normally parallel spaced relation thereto, said spring hinge means enabling said plate portion to pivot about mutually perpendicular X and Y axes defining a plane parallel to said bottom wall, said sleeve portion extending upwardly from said plate portion toward said coverplate with the axis thereof normally orthogonally related to said X and Y axes, means for mounting a cylindrical part on the upper end of said sleeve coaxially aligned with the sleeve axis, means for mounting a second part having a cylindrical opening therein on said coverplate in position to mate with said cylindrical part, a ring gear rotatably mounted on the underside of said coverplate for rotation about the sleeve axis, means for rotating said ring gear, a pulley suspended from said ring gear in position to orbit about said sleeve as the ring gear rotates, a ball bearing mounted on said sleeve, a line attached to the outer race of said ball bearing and extending radially to and over the pulley with the free end hanging downwardly from the pulley, a weight attached to the free end of the pulley, a first vertical sensing element mounted on said plate with its sensing axis aligned with said X axis, and a second vertical sensing element on said plate with its sensing axis aligned with said Y axis.

7. The invention as defined in claim 6 including a two-axis tilt stand, and wherein said housing is mounted on said tilt stand in a manner to enable the verticality of said sleeve to be adjusted by adjusting the tilt stand.

8. The method of measuring a bore of a part, which includes the steps of, fitting a cylindrical part into said bore, mounting said cylindrical part on the free end of a vertically disposed and elongated support member universally pivoted adjacent its other end, applying a radial force to said support member to cause said cylindrical part to contact the wall of said bore, orbitting said radially applied force about said support member through 360° in a manner to cause said cylindrical part to trace said bore without rotation of either of said parts, and sensing any changes in the verticality of said support member.

9. A precision device for measuring the fit between two mating parts comprising:
an elongated support member adapted to support at one end one of said two parts;
means mounting said support member, with its axis of elongation in a nominally vertical position for limited universal angular displacement about a point adjacent its other end;
means for supporting the other of said parts in mated relationship with said first part;
means for applying a radial force acting to angularly displace said support member about said point to the extent permitted by clearance between said mating parts; means for varying the direction of application of said force about said axis; and
means for sensing the universal angular displacement from vertical of said support member.

10. A precision measuring device, according to claim 9, wherein said means for varying the direction of application of said force is effective to continuously vary the direction of application of said force through 360°.

11. A precision measuring device, according to claim 9, wherein said sensing means comprises a first vertical sensing element mounted for movement with said support member and having its sensing axis aligned with one horizontal axis and a second vertical sensing element mounted for movement with said support member and having its sensing axis aligned with a second horizontal axis perpendicular to said first horizontal axis and to the axis of elongation of said support member.

12. A precision device for measuring small bores comprising:
an elongated support member;
means mounting said support member, with its axis of elongation in a nominally vertical position, for limited universal angular displacement about a point adjacent one end thereof, the other end of said support member being adapted to support a cylindrical part of known diameter;
means adapted to support a part having a bore therein in mated relationship with said cylindrical part;
means for applying a radial force acting to displace angularly said support member about said point to cause said cylindrical part to contact the wall of the bore in said second part; means for varying the direction of application of said force about said axis; and
means for sensing the universal angular displacement from vertical of said support member.

13. A precision measuring device according to claim 12, wherein said means for varying the direction of application of said force is effective to continuously vary the direction of application of said force through 360°.

References Cited by the Examiner
UNITED STATES PATENTS 1,062,566 5/1913 Gohlke et al.
2,723,461 11/1955 Reason et al. _____ 33—174

LEONARD FORMAN, *Primary Examiner.*

SAMUEL S. MATTHEWS, *Examiner.*